United States Patent [19]

Wagener et al.

[11] 4,225,407

[45] Sep. 30, 1980

[54] CATHODIC ELECTRODEPOSITION OF POLYMERS ONTO A CONDUCTIVE SURFACE

[75] Inventors: Earl H. Wagener, Concord, Calif.; Ritchie A. Wessling; Dale S. Gibbs, both of Midland, Mich.

[73] Assignee: The Dow Chemical Company, Midland, Mich.

[21] Appl. No.: 26,720

[22] Filed: Apr. 4, 1979

Related U.S. Application Data

[63] Continuation-in-part of Ser. No. 569,715, Apr. 21, 1975, abandoned, which is a continuation-in-part of Ser. No. 392,699, Aug. 29, 1973, abandoned.

[51] Int. Cl.³ ..................... C25D 13/06; C25D 13/10
[52] U.S. Cl. .................................................. 204/181 C
[58] Field of Search .................................... 204/181 C

[56] References Cited

U.S. PATENT DOCUMENTS

| | | | |
|---|---|---|---|
| 3,455,805 | 7/1969 | Smith et al. ...................... | 204/181 C |
| 3,567,613 | 3/1971 | Kraus et al. ...................... | 204/181 C |
| 3,645,872 | 2/1972 | Weigel .............................. | 204/181 C |

FOREIGN PATENT DOCUMENTS 1303480  1/1973  United Kingdom.

*Primary Examiner*—Howard S. Williams
*Attorney, Agent, or Firm*—I. A. Murphy

[57] ABSTRACT

A method for electrodeposition of an organic material on an electroconductive surface comprising placing the electroconductive surface to be coated in contact with an aqueous dispersion containing a water-insoluble, essentially electrically nonconductive, film-forming, organic polymer as cation-active particles wherein the cation-activity is provided at least predominantly by reducible nitrogen-containing cations and passing an electric current from an electrode through the latex to the electroconductive surface in such a direction that the electroconductive surface is negatively charged, i.e., becomes a cathode in an electrophoretic cell. By use of alternating current, both electrodes become coated with an adherent coating of polymer.

15 Claims, No Drawings

CATHODIC ELECTRODEPOSITION OF POLYMERS ONTO A CONDUCTIVE SURFACE

CROSS-REFERENCE TO RELATED APPLICATIONS

This application is a continuation-in-part of application Ser. No. 569,715, filed Apr. 21, 1975, which in turn is a continuation-in-part of application Ser. No. 392,699, filed Aug. 29, 1973, both now abandoned.

BACKGROUND OF THE INVENTION (1) Field of the Invention

The invention is concerned with electrodeposition of polymers in aqueous dispersion onto conductive surfaces wherein the article which comprises such surfaces is the cathode in an electric current carrying loop.

(2) Description of the Prior Art

The usual procedure for coating of polymers, which are dispersed in aqueous media, onto articles has been carried out by making the article to be coated the anode. Most such anodic depositions employ the carboxyl as the functional group which assists in the transport of the polymer to the electrode. It is generally agreed that during the deposition of the polymer on the electrode surface, hydrogen ions react with the carboxyl anion to form a water-insoluble acid. Hence, the carboxyl groups remain in the polymer thereby providing relatively hydrophilic points of attack for water. Additionally, oxidation occurs at the anode. When the anode, i.e., the article to be coated is a metal, metal ions are produced. This production of metal ions not only is destructive to the anode but may cause discoloration and also tends to coagulate the polymer in an aqueous dispersion, thus forming useless sludge. Furthermore, the charge on the polymer is pH dependent and, hence, the pH must be controlled carefully to get satisfactory coating. However, at the cathode, reduction occurs rather than oxidation. Hence, when the article to be coated is made the cathode, formation of metal ions cannot occur at that electrode. There previously has been some recognition that a cathodic electrodeposition system would be desirable. However, there are also problems with the known cationic systems. In general, especially with amine and ammonium type surfactants, the known cationic methods are carried out at low pH. Corrosion of metals becomes a problem at low pH. Such a method, for example, is shown in U.S. Pat. No. 3,159,558 in which the process is carried out at a pH of from about 2 to about 6. The cations, which provide the means of transport in most of the known cationic electrophoretic systems, remain with the polymer after deposition and continue to be points of moisture sensitivity. Furthermore, in the weak base systems, the pH and the conductivity are interdependent and cannot be easily varied independently.

SUMMARY OF THE INVENTION

In accordance with the present invention, there is provided a method of electrodeposition from aqueous dispersions of cation-active particles in an electrophoretic cell which comprises a coating bath and electrodes which constitute a cathode and at least one anode whereby a smooth, uniform, adherent, hydrophobic coating of polymer is applied to an object having an electroconductive surface by the steps of immersing the object to be coated into the coating bath comprising the aqueous dispersion of cationic particles, connecting a source of electric potential to the object to be coated as one electrode and to at least one other electrode in electrical contact with the coating bath, passing an electric current through the aqueous dispersion comprising the coating bath in such a direction that the electroconductive surface of the object to be coated becomes negatively charged and the other electrodes become positively charged. The aqueous dispersion comprising the cation-active polymer particles during the process has a conductance of from about 300 micromhos to about 3500 micromhos, preferably from about 600 to about 1800 micromhos, per centimeter and the polymer comprising the dispersed particles is a water-insoluble, essentially electrically nonconductive, film-forming organic polymer wherein a major portion of the cation activity is provided by reducible nitrogen-containing cations having a polarographic half-wave reduction potential ($E_{\frac{1}{2}}$) at 25° C. more positive than about −1.8 volts measured at a dropping mercury electrode (DME) referred to a saturated calomel electrode (SCE).

Direct or alternating current may be used in the electrodeposition. Some of the hydrophilic character of the polymer due to the cationic groups is destroyed electrolytically during the deposition and at least most of the then remaining cationic groups may be destroyed by subsequent heating.

DESCRIPTION OF THE PREFERRED EMBODIMENTS

The practice of the present invention requires an electroconductive surface to be coated, a source of electric current, an electrode to function as an anode and an aqueous dispersion of a water-insoluble, essentially electrically nonconductive, film-forming, organic polymer as cation-active particles in which the cation activity is provided primarily by the action of a reducible nitrogen-containing cation.

A wide variety of aqueous dispersions of water-insoluble, essentially electrically nonconductive polymers are suitable for the practice of this invention.

Typically, such aqueous dispersions of the polymers are obtained by emulsion polymerization of one or more monomers. Ethylenically unsaturated monomers which are thus polymerized are represented by, but not restricted to, nonionic monomers such as the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene fluoride. Specific examples of such ethylenically unsaturated compounds are styrene, α-methylstyrene, ar-methylstyrene, arethylstyrene, α-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate and 4-hydroxybutyl methacrylate; acrylonitrile, methacrylonitrile, acryloanilide, ethyl α-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene and isoprene.

Such nonionic monomers form water-insoluble homopolymers or water-insoluble copolymers when more than one of the group is used. However, there may be used as copolymerized constituents with the above kinds of monomers other monomers which as homopolymers would be water-soluble. The hydrophilic, water-soluble monomers are represented by hydroxyethyl acrylate, hydroxyethyl methacrylate, acrylamide, methacrylamide, N-methylol acrylamide, N-methylol methacrylamide and other modified acrylamides such as diacetone acrylamide and diacetone methacrylamide.

Such monomers are not used in sufficiently large proportions as to make the copolymer water-soluble or significantly electrically conductive. The proportion of such somewhat hydrophilic, water-soluble monomers which may be copolymerized constituents of the polymers operable in the practice of this invention ordinarily ranges from 0 to about 30 percent or more based on the total weight of the copolymer.

The hydrophilic monomers are used in sufficiently small proportions that they do not interfere substantially with the cationic deposition process.

The method also advantageously is used with polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example, stereospecific polyisoprene, stereospecific polybutadiene and the like. Representative preformed polymers are polymers and copolymers of the monoolefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which are electrodeposited by the present invention are alkyd resins, block and graft copolymers; e.g., styrene/butadiene graft and block copolymers; epoxy resins such as the reaction products of epichlorohydrin and bisphenol A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

The polymers, whatever their identity, are film-forming, preferably at temperatures below about 25° C.

Methods for preparing the above-described polymers are well known and are not a part of this invention.

It is required in the practice of the present invention that the polymers must be in the form of an aqueous dispersion of cation-active particles in which the cation activity is provided primarily by a reducible nitrogen-containing cation. Such cations may be attached to the polymer particles in various ways. For illustration, a surfactant comprising a reducible nitrogen-containing cation may be used in the preparation of the polymers by emulsion polymerization whereby the surfactant is adsorbed on the polymer particle. Alternatively, a latex can be prepared by emulsion polymerization using other emulsifiers then replacing at least a major proportion of the polymerization emulsifier in such latexes by removal of that emulsifier such as by dialysis or ion exchange methods and then substituting therefor a reducible, nitrogen-containing surfactant. In still another procedure, preformed polymers, obtained for example by mass polymerization, are converted to aqueous dispersions with the aid of the same kind of surfactant such as by dissolving the polymer in a solvent, then thoroughly mixing the solution with water and the surfactant and subsequently removing the solvent to obtain a latex composition. Yet another procedure is to prepare a water-in-oil dispersion by adding a surfactant comprising a reducible, nitrogen-containing cation to a preformed polymer, then slowly adding water to the water-in-oil dispersion with thorough mixing until inversion occurs to form an oil-in-water dispersion. The reducible nitrogen-containing cation also may become a part of the polymer by the copolymerization, with the other monomeric constituents of the polymer, of a monomer containing a reducible nitrogen-containing cation such as N-vinylbenzylpyridinium chloride.

The reducible nitrogen-containing cations are nitrogen-based onium ions which have a polarographic half-wave reduction potential ($E_{\frac{1}{2}}$) at 25° C. more positive than −1.8 volts. All statements concerning polarographic half-wave reduction potentials in this application relate to half-wave reduction potential measured at 25° C. at a dropping mercury electrode referred to a saturated calomel electrode (SCE).

The nitrogen in the reducible nitrogen-containing cation may be a part of a heterocyclic ring, i.e., cyclic, or not a part of a ring system, i.e., acyclic. Either the cyclic-nitrogen-containing cations or the acyclic-nitrogen-containing cations have substituents which may or may not contain aromatic components, e.g., aralkyl. Such reducible nitrogen-containing cations are provided by quaternary ammonium ions of such a structure as to possess the required polarographic half-wave reduction potential. The reducibility of a quaternary ammonium compound is controlled by the substituents on the positive nitrogen. The simplest quaternary ammonium cations, such as tetramethyl ammonium ion do not have the required reduction potential. The following structural modifications to such simple ions make a quaternary ammonium compound more easily reducible, i.e., have a more positive polarographic half-wave reduction potential:

1. replacing one methyl group with another substituent having a sufficiently large hydrophobic group so as to render the material surface active, e.g., an alkyl having from 8 to 25 carbon atoms;

2. replacing one or more of the methyl groups with an activating group such as acetomethyl, cyanomethyl or aromatic groups, for example, phenyl;

3. replacing one methyl group with an aromatic group such as benzyl having electron withdrawing substituents such as nitro, trifluoromethyl, cyano and halide on the ring;

4. incorporating the nitrogen into an aromatic ring system, such as pyridinium, quinolinium, isoquinolinium.

However, it is necessary that the quaternary ammonium ion should have more than one of the above-noted features in order to possess the required reduction potential. In order to possess the dispersibility characteristics required for use in the practice of this invention, the reducible nitrogen-containing cation must also have a component, or substituent, which is sufficiently hydrophobic so that the cation is surface-active. Provided that the cation has the required reduction potential, the identity of the hydrophobic component is not critical. In those instances where the reducible-nitrogen ion is part of a polymer by virtue of being a substituent in one of copolymerized monomers, the hydrophobic polymer chain, itself, can provide the required hydrophobic character. In other cases, the reducible cation has a long chain hydrophobic substituent radical. This radical may be, for example, a hydrocarbon radical having at least 8 carbon atoms or a long-chain radical which is a primarily hydrocarbon chain having at least about 10 carbon atoms wherein the chain length is interrupted by oxygen, sulfur or a keto, ester or amide linkage or wherein a terminal group is present, such as hydroxy, keto, ester or amide.

These hydrophobic radicals are not restricted to linear chains and may include aromatic components such as aralkyl. The hydrophobic portion of the cation is directly attached to an acyclic-nitrogen-containing cation but in the case of the cyclic-nitrogen-containing cation, the hydrophobic radical may be attached directly to the nitrogen or may be attached to a carbon in the heterocyclic ring.

Since the compositions for use in the practice of this invention require a reducible-nitrogen cation, a counterion, i.e., an anion, also is necessary. The identity of the anion is not critical but such anions must be electrolytically acceptable, must not coagulate the dispersion and must be water-soluble over the pH range which is being used in a particular electrodeposition.

The counteranion typically is the anion of an inorganic acid such as chloride, bromide, fluoride, nitrate, bicarbonate, and phosphate; or an anion of an organic acid such as acetate, maleate, citrate, propionate, fumarate, acrylate and benzoate or hydroxide.

The reducible cation, together with its counterion, constitute a compound which is a cationic surfactant except in those cases where the cation is chemically attached, such as by copolymerization, to a polymer chain having greater than about 26 carbon atoms. In the latter instance, the necessary cation activity for this invention is possessed by the polymer particle per se whereas in the other instance, the cationic surfactant cations are adsorbed on the surface of a polymer particle to provide the necessary cation activity.

Unsaturated heterocyclic nitrogen ions such as quaternized pyridinium, quinolinium, isoquinolinium, phthalazinium, benzimidazolium, benzothiazolium and benzotriazolium ions, which have a hydrophobic substituent of sufficient size (as described above) to make the ion surface active, meet the requirements for the cationic component required in the practice of this invention.

Acyclic quaternized nitrogen ions, even though possessing the requisite hydrophobic component, meet the requirements as to reduction potential only when they additionally contain activating groups such as an aromatic radical having electron withdrawing substituents, e.g., nitro, trifluoromethyl, cyano and halide.

Suitable quaternized pyridinium compounds for use as surfactants in the practice of the present invention are represented by:
N-octylpyridinium chloride,
N-dodecylpyridinium chloride,
N-hexadecylpyridinium chloride,
N-octadecylpyridinium chloride,
N-butyl-2-tridecylpyridinium chloride,
N-lauryl-2-methylpyridinium chloride,
N-octadecyl-2-ethylpyridinium chloride,
N-(4-dodecylbenzyl)pyridinium chloride,
N-methyl-4-pentadecylpyridinium chloride,
N-(4-heptadecylbenzyl)pyridinium chloride,
N-butyl-4-eicosylpyridinium chloride,
N-butyl-4-(1-hexyldecyl)pyridinium chloride,
N-octyl-4-ethylpyridinium chloride,
N-decyl-4-nonylpyridinium chloride,
N-dodecyl-4-heptylpyridinium chloride,
N-octadecyl-3-ethylpyridinium chloride,
N-dodecyl-3-methylpyridinium chloride,
N-tetradecyl-3-amylpyridinium chloride,
N-hexadecyl-3-methylpyridinium chloride,
N-dodecyl-3-acetylpyridinium chloride,
N-dodecyl-3-valerylpyridinium chloride,
N-methyl-3-hexadecanoylpyridinium chloride,
N-benzyl-3-hexadecanoylpyridinium chloride,
N-(2,4-dichlorobenzyl)-4-octylpyridinium chloride,
N-(2-nitrobenzyl)-4-octylpyridinium chloride,
N-(4-nitrobenzyl)-4-octylpyridinium chloride,
N-(3,4-dichlorobenzyl)-4-tridecylpyridinium chloride,
N-(6-hexylphenacyl)pyridinium chloride,
N-dodecyl-2,6-dimethylpyridinium chloride,
N-dodecyl-5-ethyl-2-methylpyridinium chloride,
N-(4-hexylphenethyl)pyridinium chloride,
N-(4-dodecylphenethyl)pyridinium chloride and
N-(4-tert-octylphenoxy-2-ethyl)pyridinium chloride.

Suitable quaternized quinolinium compounds are represented by:
N-methyl-2-undecylquinolinium chloride,
N-dodecylquinolinium chloride,
N-methyl-8-(palmitoyloxy)quinolinium chloride,
N-methyl-8-(lauroyloxy)quinolinium chloride,
N-decyl-2-methyl-8-chloroquinolinium chloride,
N-(3,5,5-trimethylhexyl)quinolinium chloride,
N-methyl-2-undecylquinolinium chloride,
N-benzyl-6-(hexyloxy)quinolinium chloride,
N-benzyl-7-(lauryloxy)quinolinium chloride, and
N-(4-dodecylbenzyl)quinolinium chloride.

Analogous quaternized isoquinolinium compounds also are suitable, such as:
N-laurylisoquinolinium chloride,
N-(4-dodecylbenzyl)isoquinolinium chloride,
N-benzyl-6-(hexyloxy)isoquinolinium chloride,
N-methyl-1-laurylisoquinolinium chloride,
N-octadecylisoquinolinium chloride, and
N-(3,5,5-trimethylhexyl)isoquinolinium chloride.

Suitable quaternized benzimidazolium compounds are represented by:
N-methyl-N'-laurylbenzimidazolium chloride,
N-benzyl-N'-laurylbenzimidazolium chloride, and
N-methyl-N'-hexadecylbenzimidazolium chloride.

Other unsaturated heterocyclic quaternized reducible nitrogen-containing compounds are represented by:
N-octadecyl-2-methylbenzothiazolium chloride,
N-(3,5,5-trimethylhexyl)benzothiazolium chloride, and
1-(carbethoxymethyl)-3-hexadecylbenzotriazolium chloride.

Suitable acyclic quaternized nitrogen compounds for use as surfactants in the practice of the present invention are represented by:
N-dodecyl-N-(m-trifluoromethylbenzyl)-N,N-dimethyl ammonium chloride,
N-dodecyl-N,N-dimethyl-N-(p-nitrobenzyl) ammonium chloride,
N-acetonyl-N-dodecyl-N,N-dimethyl ammonium chloride, N-(4-dodecylbenzyl)-N,N-dimethylanilinium chloride, and N-benzyl-N,N-dimethyl-(4-octyl)anilinium chloride.

All of the reducible quaternized-nitrogen-containing cationic materials, listed above as representative, have the chloride ion as the counter-ion. Alkyl halides, particularly alkyl chlorides and alkyl bromides, are common quaternizing agents and thus the quaternary nitrogen compounds are often available with halide counterions, i.e., anions. However, other quaternizing agents are available, e.g., dimethyl sulfate, which result in quaternized nitrogen compounds having other anions such as methyl sulfate. If it is desired to use quaternized nitrogen compounds having other anions than possessed by the compound which is available, the desired anion can be substituted by simple ion exchange methods. Thus, any of the above-named compounds can be obtained and used wherein, instead of the chloride counter-ions, the anion is bromide, fluoride, nitrate, bicarbonate, phosphate, acetate, maleate, citrate, propionate, fumarate, acrylate, benzoate or hydroxide.

The particle size (average diameter) of the aqueous dispersion or latex, however obtained, usually is in the range of from about 500 Angstroms to about 10,000 Angstroms, preferably less than about 5,000 Angstroms, especially less than about 1,500 Angstroms.

The polymer particles have hydrophobic properties because of the nature of the polymer but have some hydrophilic character through positive charges, and hence some cationic character, because of the presence on the particle surface of reducible-nitrogen groups such as from adsorbed emulsifiers or from copolymerized monomers having reducible-nitrogen groups wherein the amount of such groups attached to the polymer is sufficient to provide water-dispersibility but is insufficient to impart water solubility or electrical conductivity to the dry, organic, film-forming polymer. Whether the reducible-nitrogen groups are present on the polymer because of adsorbed surfactants containing the groups, because of copolymerization of monomers containing such groups, or because of conversion of other substituent groups on the polymer to reducible-nitrogen groups, the quantity of such groups usually ranges from about 0.02 milliequivalent to about 0.4 milliequivalent per gram of polymer but can range from about 0.02 milliequivalent per gram to about 0.6 milliequivalent per gram and preferably is from about 0.25 to about 0.4 milliequivalent per gram.

In this specification and the accompanying claims the term "cation-active particles" as applied to the polymer particles refers to particles according to the foregoing description.

The process of this invention is used to coat any electroconductive surface, i.e., articles having an electroconductive surface. Examples of materials which furnish electroconductive surfaces are metals such as iron, steel, phosphated steel, copper, aluminum, chromium, magnesium, tin, titanium, nickel, lead, zinc or a metal alloy consisting of any of the aforesaid metals, conductive gels, conductive polymers and various forms of carbon such as graphite. Such materials can be in various forms or articles such as automobiles, wire, appliances, metal cans, siding, conductive paper and the like.

In the various embodiments of this invention a smooth, uniform, adherent, water-insensitive coating is applied to the electroconductive surface.

The aqueous dispersions which are used in the electrocoating process are employed at a polymer concentration of from about 0.5 percent to about 50 percent by weight, preferably from about 2 percent to about 15 percent. For operability the process is essentially pH independent. For example, the process gives good electrodeposition performance with aqueous dispersions having a range of pH of from about 2 to about 12. Because of corrosion problems below a pH of 6, however, operation above a pH of 6 is preferred. Although operable in the process above a pH of 10, some quaternary ammonium compounds decompose with time at such pH values. Therefore, a pH range of from about 7 to about 10 is especially preferred.

The aqueous dispersions, as formulated for the electrodeposition process, have a conductivity of from about 300 micromhos to about 3500 micromhos per centimeter, preferably from about 600 micromhos to about 1800 micromhos per centimeter, as measured at 25° C. and 10 percent solids.

In carrying out the electrodeposition process of this invention, an electrophoretic cell is utilized. In the process, the surface to be coated becomes a cathode, another electrode becomes an anode, the latex composition comprises the coating bath and a source of electric current is required. During the process, the article to be coated can be positioned and maintained so that the surface to be coated is stationary within the coating bath or can be passed through a coating bath in a continuous manner. With direct current, the source is connected to the electrodes so that the current flows in such a direction as to maintain the article to be coated as the cathode and the other electrode as the anode in an electrophoretic system. The anode and the cathode may each be a single member or either or both may constitute a plurality of joined members. If desired, the anode may be separated by a diaphragm from the polymer dispersion. Thus, the anode per se is in electrical contact, but not necessarily physical contact, with the aqueous polymer dispersion. In the use of direct current the anode preferably should be inert for this cationic electrodeposition system and can be the tank in which the process is carried out, for example, if the tank is of metal which is graphite-coated on the interior surfaces. If alternating current is used, then the charge on the electrodes alternates between positive and negative and a particular electrode becomes coated during the periods when it is negatively charged. During the electrodeposition, the electromotive force is applied in various ways:

(1) constant source voltage which results in decreasing current as the electrodeposition proceeds;

(2) constant current flow which requires increasing voltage as the process occurs;

(3) constant cathode potential; and (4) pulse, i.e., high voltages for short, intermittent times.

The electromotive force which may be applied in the present process covers a wide range such as from about 10 volts to about 5,000 volts. However, the significant advantages of the present invention are most noticeable at voltages above about 100 volts, although above about 125 volts is preferred. With the first three of the above-listed methods of application, the applied potential generally is not greater than about 350 volts. With the fourth method of application, the potential used ranges from about 200 to about 5,000 volts, preferably to about 800 volts.

The coating bath conveniently is operated at ambient temperature, preferably from about 20° C. to about 35° C. although temperatures from about 0° C. to about 70° C. or 80° C. may be used.

In prior known electrocoating processes using aqueous dispersions of film-forming, organic polymers, supporting electrolytes ordinarily are not used. The presence of extraneous electrolyte is known to have a deleterious effect on such processes. However, to obtain optimum results in the practice of the present invention, certain types of water-soluble inorganic salts are used to control conductivity. The salt concentration can affect film thickness, quantity of electricity used, efficiency (milligrams of coating deposited per coulomb), and appearance of the coating. Various kinds of salts may be used as supporting electrolytes. The anions of such salts may be selected from the same kinds which are suitable as the counter-ion for the quaternary ammonium cation required for the process. The cations of the supporting electrolyte salts should be selected so as not to interfere with the electrodeposition of the resin as the cathode. Undesirable cations include the alkali metal ions and calcium ions, which can be tolerated, however, at low concentrations, i.e., less than about 0.002 normal. In general, such undesirable ions have electrode potentials more negative than $-2.40$ volts as defined at pages 414 and 415, with values being listed from page 415 through page 426, of *The Encyclopedia of Electrochemistry*, Clifford A. Hampel, Editor, Reinhold Publishing Corporation, New York, 1964.

In the present process, a supporting electrolyte assists in some embodiments of the invention to improve efficiency, particularly at low emulsifier concentrations. The addition of supporting electrolyte increases throwing power at constant pH. Such supporting electrolytes are water soluble and may be used in small amounts such as up to about 0.1 normal based on the total volume of the aqueous dispersion of the coating bath. However, the amount used should not be sufficient to raise the conductivity of the aqueous dispersion above about 3500 micromhos per centimeter. Ammonium salts of weak acids, such as ammonium acetate, ammonium borate, ammonium carbonate, ammonium bicarbonate and ammonium maleate, are preferred. Diammonium hydrogen phosphate has been found to be especially effective. In addition to their conductive contribution, the preferred salts also serve to buffer the aqueous medium and, in general, to assist in the deposition of smooth, adherent films.

The coating bath comprises the aqueous dispersion of polymer including the reducible-nitrogen surfactant and various optional additives. Such additives include, for illustration, pH control agents, buffers, and supporting electrolytes as referred to above and also such materials as dyes, pigments, fillers, agents for improved flow, and standard plasticizers and/or cross-linking systems for the particular polymer being electrodeposited.

When the conducting surface of the article to be coated is maintained stationary in the coating bath, the flow of current stops, or becomes very low, when the article is coated. In such a process, the polymer coating ordinarily is deposited on the electroconductive surface within from about 10 seconds to about 2 minutes, although under the extremes of conditions, the deposition can be accomplished in one second or less. In the preferred embodiments, deposition occurs with rapid current cut off and is complete in less than 2 minutes. In electrodeposition processes in which the surface to be coated is passed through the coating bath in a continuous manner, such as in wire coating, the current does not cut off. During the electrodeposition process, it is advantageous that the coating bath should be circulated continuously.

The thickness of the film which is electrodeposited ranges from about 0.1 mil to about 2 mils depending on the conductive substrate, the polymer composition, the soap concentration, the type of inorganic salt, the inorganic salt concentration, the applied voltage, the current density, the pH, the temperature of the coating bath, the deposition time and solids concentration in the coating bath. The film, as deposited, is very hydrophobic and is firmly adhered to the conductive substrate. In usual practice, the coated article is rinsed by a stream or spray of deionized water. Such treatment does not swell, soften or dislodge the electrodeposited film.

The present invention provides an electrodeposition system which has excellent throwing power. By "throwing power" is meant that property whereby areas of the electrode being coated at varying distances from the other electrode receives substantially the same density and thickness of the coating material when coated at the same potential. Throwing power relates to the ability to coat hidden areas on irregular shaped objects. There are several methods for measuring throwing power. To obtain the results shown in the examples of this specification, a tank made of Plexiglas having a depth (inside) of 10 cm was used which, viewed from the top, is L-shaped. The base of the L has a width of 3 cm and the other arm of the L has a width of 1.5 cm (all inside measurements) with no internal division between them. In the base of the L, two 4-inch square (10 cm×10 cm) panels are disposed opposite each other and parallel to each other and to the base of the L. One panel is a carbon plate and functions as a reference electrode, i.e., the anode. The other panel is phosphatized steel (Bonderite 37) and functions as the cathode. The other arm of the L is the "throwing power" section and contains a phosphatized steel panel, 4 inches×12 inches (10 cm×30 cm), which is connected by a shunt to the cathode in the base of the L. In carrying out a test, the tank is filled to a depth of about 9 cm with the coating composition dispersion so that approximately three-quarters of each panel is immersed in the dispersion and a source of the desired voltage is connected to the anode and cathode in the base of the L for 2 minutes (unless otherwise specified). The throwing power in percentage is recorded according to the percentage of the long dimension of the 4-inch by 12-inch panel which is coated, $$\text{i.e., } \frac{\text{coated distance, inches (or cm)}}{\text{12 inches (or 30 cm)}} \times 100\%.$$

This apparatus, with one significant difference, is the same as that described by A. E. Gilchrist and D. O. Shuster at page 195 and illustrated in FIG. 1 in *Electrodeposition of Coatings*, Advances in Chemistry Series, No. 119, American Chemical Society (1973) (Library of Congress Card No. 73-75713). The difference is that the polarity is reversed on the electrodes since Gilchrist and Shuster were measuring anodic electrodeposition whereas the present invention is concerned with cathodic electrodeposition.

In order to be acceptable, the throwing power should be at least 25 percent and preferably should be greater than about 40 percent.

The following examples show ways in which the present invention can be practiced, but should not be construed as limiting the invention. All parts are parts by weight and all percentages are weight percentages, unless otherwise expressly indicated.

Throughout this specification, all references to values for conductivity are values as measured at 25° C. unless specifically indicated otherwise.

EXAMPLES 1-15

Numerous steel panels were coated by cathodic electrodeposition as summarized in Table I. For each series a rectangular polyethylene electrodeposition cell containing two graphite anodes of equal size located at the ends of the long axis was partially filled with a latex having the pH as shown and containing 10 percent by weight of a copolymer of 60 percent by weight of butyl acrylate and 40 percent by weight of styrene and also containing the amount and kind of surfactant shown in Table I. In Examples 1-15, the conductivity of the aqueous dispersion was adjusted to the value shown by the addition of diammonium hydrogen phosphate.

A rectangular sample, about 2¾ inches by 5⅞ inches by 1/16 inch, of phosphated steel (Bonderite 37) was immersed in the latex to a depth sufficient to provide 10,000 square millimeters of metal surface in contact with the latex halfway between the two anodes with the flat 2¾ inch by 5⅞ inch plane normal to a straight line between the two anodes. A source of direct current at the indicated potential was connected to the two anodes and to the steel sample which functioned as the cathode. After 2 minutes, the residual current was measured, the potential source was disconnected and the sample was rinsed in a stream of deionized water. After drying the coating, the coating weight and efficiency were determined. Except as indicated, the test results shown in Table I are the average results for separate tests on four panels.

The throwing power was determined on a single sample according to the method described supra.

In all of Examples 1-15 during the water rinse of the panels, the electrodeposited coating remained firmly adhered to the metal.

TABLE I

| | PROCESS CONDITIONS | | | | TEST RESULTS(b) | | | |
|---|---|---|---|---|---|---|---|---|
| | Surfactant | | | | Coating | | Residual | Throwing |
| Ex. No. | Kind(a) | meg/g Solids | Volts | pH | Conductivity mho/cm × $10^6$ | Weight mg. | Efficiency Mg/Coul. | Current m.a. | Power % |
| 1 | DBPC | 0.10 | 200 | 7.4 | 1070.0 | 85 | 8.5 | 37 | 64 |
| 2 | DBPC | 0.10 | 100 | 7.4 | 1070.0 | x | x | x | 41 |
| 3 | DBPC | 0.10 | 40 | 7.4 | 1070.0 | x | x | x | 23 |
| 4 | DBPC | 0.10 | 200 | 7.2 | 2000.0 | 112 | 11.4 | 40 | 76 |
| 5 | DBPC | 0.10 | 200 | 3.6 | 1030.0 | 168 | 14.8 | 40 | 64 |
| 6 | DBPC | 0.10 | 100 | 3.6 | 1030.0 | x | x | x | 41 |
| 7 | DBPC | 0.10 | 40 | 3.6 | 1030.0 | x | x | x | 21 |
| 8 | HDPC | 0.10 | 200 | 7.3 | 340.0 | 84 | 7.3 | 35 | 38 |
| 9 | HDPC | 0.10 | 100 | 7.3 | 340.0 | x | x | x | 29 |
| 10 | HDPC | 0.10 | 200 | 7.2 | 1110.0 | 130 | 14.2 | 14 | 90 |
| 11 | HDPC | 0.10 | 100 | 7.2 | 1110.0 | x | x | x | 50 |
| 12 | FMBDMDAC | 0.10 | 200 | 7.4 | 1020.0 | 153 | 22.8 | 19 | 67 |
| 13 | FMBDMDAC | 0.10 | 100 | 7.4 | 1020.0 | x | x | x | 46 |
| 14 | ADDMAB | 0.15 | 200 | 7.5 | 1450.0 | 212 | 9.8 | <20 | 64 |
| 15 | LiQB | 0.09 | 200 | 7.5 | 940.0 | 51(c) | 17.2(c) | 36(c) | 100 |

(a)For explanation of abbreviations and $E_i$ data, see TABLE III
(b)The coating in each of these examples was smooth and uniform in thickness.
(c)Results are the average of two test panels.
x Not determined

COMPARATIVE EXAMPLES A-J

In the same manner as described for Examples 1-15, additional panels were coated by cathodic electrodeposition, wherein nitrogen-containing cationic surfactants not meeting the requirements for this invention were used in the latex rather than the reducible-nitrogen containing surfactants as defined. These tests (not examples of the invention) are summarized in Table II. Except as indicated, the coating weights, efficiencies and residual current shown in the Table are an average for individual tests on from 3 to 5 separate panels. Throwing power data is from tests on a single panel.

TABLE II

| | PROCESS CONDITIONS | | | | TEST RESULTS(b) | | | |
|---|---|---|---|---|---|---|---|---|
| | Surfactant | | | | Coating | | Residual | Throwing |
| Ex. No. | Kind(a) | meg/g Solids | Volts | pH | Conductivity mho/cm × $10^6$ | Weight mg. | Efficiency Mg/Coul. | Current m.a. | Power % |
| A | DBDEEAC | 0.10 | 200 | 7.5 | 1110.0 | 574 | 15.0 | 157 | 83 |
| B | DBDEEAC | 0.10 | 100 | 7.5 | 1110.0 | 973(c) | 14.4(c) | 165(c) | 20 |
| C | DBDEEAC | 0.10 | 40 | 7.5 | 1110.0 | x | x | x | 9 |
| D | DBDEEAC | 0.10 | 200 | 3.7 | 1070.0 | 481 | 16.1 | 123 | 40 |
| E | DBDEEAC | 0.10 | 100 | 3.7 | 1070.0 | x | x | x | 26 |
| F | DBDEEAC | 0.10 | 40 | 3.7 | 1070.0 | 166(c) | 6.8(c) | 135(c) | 14 |
| G | DBTEAC | 0.10 | 200 | 3.7 | 1060.0 | 308 | 11.7 | 59 | 32 |
| H | DBTEAC | 0.10 | 100 | 3.7 | 1060.0 | 239(c) | 5.8(c) | 90(c) | 18 |
| I | DBTEAC | 0.10 | 200 | 7.5 | 1105.0 | 408 | 21.2 | 59 | 33 |
| J | DBTEAC | 0.10 | 100 | 7.5 | 1105.0 | 559(c) | 15.4(c) | 70(c) | 17 |

(a)For explanation of abbreviations and $E_i$ data, see TABLE III
(b)The coating in each of these tests was rough, bubbly and non-uniform in thickness.
(c)Tests results for a single panel
x Not determined

TABLE III
SURFACTANTS

| Abbreviation | Identification | $E_{\frac{1}{2}}$ (a) |
|---|---|---|
| DBPC | N-p-Dodecylbenzylpyridinium chloride | −1.00 |
| HDPC | N-Hexadecylpyridinium chloride | −1.30 |
| FMBDMDAC | N-m-Trifluoromethylbenzyl-N,N-dimethyl-N-dodecyl ammonium chloride | −1.64 |
| ADDMAB | N-acetonyl-N-dodecyl-N,N-dimethyl ammonium bromide | −1.25 |
|  |  | −1.4 |
|  |  | −1.6 |
| LiQB | N-Laurylisoquinolinium bromide | −1.17 |
| DBDEEAC | N-p-Dodecylbenzyl-N,N-diethyl-N-ethanol ammonium chloride | <−2. |
| DBTEAC | N-p-Dodecylbenzyl-N,N,N-triethyl ammonium chloride | <−2. |

(a) $<-x$ = less than $-x$, i.e., more negative than $-x$.

EXAMPLE 16

In the same manner as described for Examples 1–15, four phosphated steel panels were coated with the same polymer by cathodic electrodeposition except that the surface area of the panels subjected to coating conditions was 729 square millimeters rather than 10,000 square millimeters and a different surfactant was used in the aqueous dispersion. The starting aqueous polymer dispersion (latex) had been prepared by emulsion polymerization of 60 parts by weight of butyl acrylate and 40 parts by weight of styrene using p-dodecylbenzyldimethylsulfonium chloride as the emulsion stabilizing agent (surfactant). This starting dispersion was dialyzed for a sufficient period to reduce the quantity of surfactant to 0.035 milliequivalent per gram of polymer. Sufficient additional surfactant, p-nitrobenzyldodecyldimethyl ammonium chloride, was added to provide 0.035 milliequivalent per gram of polymer in the dispersion. The aqueous dispersion as 16.2 percent solids content was treated with ion exchange resin until the pH reached a value of 10. Diammonium hydrogen phosphate was added in sufficient amount to provide 0.035 milliequivalent per gram of polymer and the aqueous dispersion was diluted with water to provide 10 percent solids in the dispersion. The resulting latex had a pH of 8.3 and the conductance was 420 micromhos per centimeter. Electrodeposition was carried out with this dispersion at an applied potential of 200 volts as otherwise described for Examples 1–15. The nitrogen-containing sufactant used in this Example has one polarographic half-wave reduction potential at −0.53 volt and another at −1.35 volts. The residual current after two minutes was less than 15 milliamperes. Smooth coatings, uniform in thickness, were obtained with an average coating weight of 33 milligrams and an efficiency of 46.0 milligrams of coating per coulomb. During the water rinse, the coating remained firmly adhered to the metal.

A comparative example K, was run in the same manner and with the same materials as Example 16 except that for the p-nitrobenzyldodecyldimethyl ammonium chloride there was substituted 0.035 milliequivalent of dodecylbenzyltrimethyl ammonium chloride which has a polarographic half-wave reduction potential more negative than −2 volts. The conductance was found to be 460 micromhos per centimeters and the pH was 8.6. The residual current after 2 minutes was less than 15 milliamperes but the coatings were rough, bubbly and non-uniform in thickness. The average coating weight was 106.5 milligrams and the efficiency was 34.7 milligrams per coulomb.

EXAMPLE 17

A coating was electrodeposited in the same manner, unde the same conditions and with the same materials as in Example 15 except that the coating was deposited on uncoated steel rather than on Bonderite 37. The residual current after 2 minutes was 25 milliamperes. A smooth uniform coating having a weight of 110.4 milligrams was obtained with an efficiency of 38.5 milligrams of coating per coulomb. During the water rinse, the coating continued to be firmly adhered to the metal.

EXAMPLE 18

Other panels were coated in substantially the same manner as described for Examples 1–15, except that for the latex of those examples there was substituted a latex having a particle size of 1450 Angstroms and containing 10 percent by weight of a copolymer of 43 percent of styrene, 55 percent of butadiene and 2 percent of 2-hydroxyethyl acylate and also containing 0.03 milliequivalent of dodecylbenzyldimethylsulfonium chloride and 0.17 milliequivalent of dodecylbenzylpyridinum chloride per gram of solids in the latex. As in Examples 1–15, the conductivity was adjusted with diammonium hydrogen phosphate to the indicated value and the pH was adjusted to about 7. The latex according to the invention (Example 18) had a conductivity of 3525 micromhos per centimeter. One portion of the latex was electrocoated at 60 volts for 30 seconds (18-1) and another portion at 150 volts for 30 seconds (18-2). Electrodeposition data is shown below in Table IV.

The conductivity of another portion of the latex was adjusted to 11,500 micromhos per centimeter (Comparative Material L). One portion of Comparative Material L was electrocoated at 60 volts for 30 seconds (L-1) and another portion at 150 volts for 30 seconds (L-2). With the remainder of Comparative Material L was mixed additional diammonium hydrogen phosphate to adjust the conductivity to 16,000 micromhos per centimeter (Comparative Material M). Separate portions of Comparative Material M were electrocoated at 60 volts (M-1) and 150 volts (M-2) for 30 seconds. The peak current in amperes per square centimeter, the residual current at 30 seconds in the same units, and the coating weight in milligrams per square centimeter are shown in Table IV.

TABLE IV

| Sample | Volts | Peak Current amp/dm² | Residual Current amp/dm² | Coating Weight mg/cm² |
|---|---|---|---|---|
| 18-1 | 60 | 6.5 | <0.1 | 1.3 |
| 18-2 | 150 | 8 | <0.1 | 1.6 |
| *L-1 | 60 | 17 | 0.35 | 1.0 |
| *L-2 | 150 | 24 | 0.4 | 0.9 |
| *M-1 | 60 | 25 | 0.4 | 0.7 |
| *M-2 | 150 | >25[a] | 0.5 | 0.9 |

*not examples of the invention
[a] limit of the meter

Because of heat-up of the bath with the high conductivity samples, it was not practical to maintain the voltage for 2 minutes and measure the residual current at that time as in Examples 1–15. Accordingly, the residual current for all the materials in Table IV is shown at 30 seconds. For the electrocoating according to the invention (18-1 and 18-2) the coatings had a smooth, uniform appearance and there was very little wash-off when the coatings were rinsed with water: the coatings from L-1 and L-2 had a rough, pock-marked appearance and had ruptured. The coatings from M-1 and M-2 also had ruptured and were rough in appearance. After 24 hours the remainder of the latex having a conductivity of 3525 micromhos per centimeter showed no evidence of destabilization. None of Comparative Material L remained for checking but the remainder of Comparative Material M coagulated in less than 24 hours.

EXAMPLE 19

A polymer was prepared by solution copolymerization at 80° C. in the following recipe. An initial charge of 150 grams of denatured ethanol was placed in a reactor in which a nitrogen atmosphere was maintained. Two separate feed streams were added to the reactor over a period of 3½ hours.

| Feed No. 1 | Grams |
|---|---|
| Denatured Alcohol | 50 |
| Methyl Methacrylate | 140 |
| Butyl Acrylate | 140 |
| 2,2-Azobisisobutyronitrile (Initiator) | 6 |
| 2-Mercaptoethanol | 1.5 |

| Feed No. 2 | Grams |
|---|---|
| Denatured Alcohol | 100 |
| Adduct of vinylbenzyl chloride and pyridine (90 meq) as a 50 weight percent solution in the n-butyl ether of ethylene glycol | 46.6 |

Ten minutes after the last of the monomers were added, an additional 0.5 gram of the same kind of initiator was added and the temperature was maintained for 3 hours at 80° C. The reaction mixture was allowed to stand overnight then was filtered. The product had a pH of 6.6, a cationic charge of 0.309 milliequivalent per gram of solids and an average solids content of 47.67 percent.

A sufficient quantity of the product to provide 50 grams of solids (104.9 g×47.67%) was diluted by stirring while deionized water was added slowly. A stable emulsion was formed which was diluted further to about 25 percent solids, then vacuum stripped at 40° C. to remove alcohol (64 grams of material was removed). The resulting product was again diluted with deionized water—final solids, 21.8 percent. A small quantity (3 grams) of the n-butyl ether of ethylene glycol was added to 40 grams (solids basis) of the product. Then, the conductivity was adjusted to 1200 micromhos per centimeter (as measured at 10 percent solids and 25° C.) by addition of dilute aqueous diammonium hydrogen phosphate and the solids content was reduced to 10 percent by the addition of deionized water. The final pH was 7.2.

Phosphated steel panels (4) were coated with the resulting composition by the method described in Examples 1–15 (except that the electrodeposition cell was constructed of glass rather than polyethylene) at an applied potential of 200 volts. The coating system showed rapid current cut-off. The freshly deposited adherent film was smooth and uniform in thickness and remained adherent to the panels during the water-rinse step. Two of the panels (A and B) were heated for 20 minutes at 175° C. to destroy residual pyridinium groups and the other two panels (C and D) were dried and weighed. Even the freshly deposited film appeared to be extensively cross-linked since the heat cure of the other panels did not change the film appearance.

| Panel No. | Coating Weight mq. |
|---|---|
| 19-A | 218 |
| 19-B | 217 |
| 19-C | 243 |
| 19-D | 234 |

EXAMPLE 20

A latex was prepared by emulsion copolymerizing at 60° C. in aqueous media an equal-weight mixture of methyl methacrylate and butyl acrylate with sufficient N-(p-dodecylbenzyl)-4-vinylpyridinium chloride to provide 30 milliequivalents of cationic groups per 100 grams of monomers and 2 percent, based on the monomer weight, of 2-mercaptoethanol as chain transfer agent. The N-(p-dodecylbenzyl)-4-methylpyridinium chloride had been prepared by reacting dodecylbenzyl chloride with 4-vinylpyridine in a 1:1 mole ratio in methanol at 50° C. for 48 hours; the ionic monomer which was formed was recovered from the methanol solution of monomer by extracting the oil soluble fraction with n-hexane, the remaining fraction (which contained some n-hexane) was stripped to remove the n-hexane and methanol was back added to obtain a solution of monomer in methanol; the cationic activity was determined by chloride titration and was found to be 0.72 milliequivalent of charge per gram of solution.

The latex prepared according to the description above had a solids content of 24.75 percent. A portion of the latex in sufficient amount to provide 40 grams of solids (161.6 grams) was diluted to 360 grams (total weight) with deionized water, the pH of the diluted latex was raised to 7.5 by use of ion exchange, and the conductivity was raised to 1200 micromhos per centimeter (measured at 10 percent solids and 25° C.) by adding a dilute (10 percent) aqueous solution of diammonium hydrogen phosphate. 2-Ethylhexanol was added in an amount of 10 percent by weight based on polymer solids and the resulting mixture was stirred for two hours. Phosphated steel panels were coated with the resulting composition by the method described for Examples 1–15 (except that the electrodeposition cell was constructed of glass rather than polyethylene) at an applied potential of 200 volts. After the rinsing step, the panels were found to be coated with adherent, smooth films of uniform thickness. The coating on the panels was heated at 120° C. for 20 minutes to destroy any residual pyridinium groups. The resulting cured coatings had a coating weight of 315 milligrams and 324 milligrams, respectively, were smooth, uniform and glossy and were unaffected by water as tested by soaking the panels in water at ambient conditions for 24 hours and noting that no evidence of solvation, brushing or loosening of the film was found. This example illustrates the method of the invention using a pyridinium latex which is free of conventional emulsifier, sometimes called a "soap-free" latex.

EXAMPLE 21

A commercial liquid epoxy resin having an epoxy equivalent weight of 186 (essentially the diglycidyl ether of bisphenol A) (19.63 parts), a commercial grade of bisphenol A (9.03 parts), and nonylphenol (1.95 parts) were added to a reaction vessel and thoroughly mixed at a temperature of approximately 45° C. A small but catalytic amount (about 0.09 weight percent, based on the total weight of the mixture) of ethyltriphenylphosphonium acetate/acetic acid complex dissolved in methanol was thoroughly mixed with the resulting reaction mixture. The reaction vessel and contents were then heated until a temperature exotherm was observed, then external heating was discontinued. The temperature of the reaction mixture peaked at 172° C. The reaction mixture was then heated at 165° C. for approximately one hour after the exotherm had subsided. The product was essentially a linear condensation polymer of the diglycidyl ether of bisphenol A and bisphenol A, partially capped with nonylphenoxy groups and having terminal vicinal epoxy groups with an epoxide content of 2.39 weight percent (as analyzed by the perchloric acid technique set forth in "Handbook of Epoxy Resins" by Lee and Neville, McGraw Hill Publishing Company, New York (1967), pp 4–14, 15). A portion of this reaction mixture (7.2 parts) was removed for such purposes as analytical tests. Monobutyl ether of ethylene glycol (6.38 parts) was added to the remainder of the reaction mixture as the mass cooled to approximately 70° C.–75° C.

Terminal epoxy groups of the condensation polymer were converted to terminal pyridinium groups in the following manner: a solution of pyridine (1 part), acetic acid (0.83 part) and water (2.25 parts) was slowly added to the stirred reaction product from the above step; the temperature was maintained at approximately 75° C. and the addition required approximately 35 minutes. Additional water (2.25 parts) was then added to the reaction mixture with stirring. The stirred reaction mass was maintained at 70° C.–80° C. for approximately 7.5 hours. The resulting product was a water-dispersible liquid having a charge density of 0.42 milliequivalent of pyridinium groups per gram of nonvolatiles.

The water-dispersible liquid was converted to an emulsion by stirring the liquid at 70° C.–80° C. while adding dropwise deionized water. The resulting emulsion had a nonvolatile content of 35.5 percent, 0.395 milliequivalent of cationic charge (pyridinium) per gram of nonvolatiles (determined by analysis for acetate ion) and an average particle size of 685 Angstroms as determined by light scattering.

A sufficient quantity of the emulsion to provide 40 grams of solids was diluted to 380 grams (total) with deionized water, the pH was raised to 7.1 by addition of dilute ammonium hydroxide and the conductivity was raised to 1215 micromhos per centimeter (as measured at 10 percent solids and 25° C.) by addition of diammonium hydrogen phosphate. Then 4 grams of 2-ethylhexanol was added and the resulting mixture was stirred overnight. Phosphated steel panels were coated with the resulting composition by the method described for Examples 1–15 (except that the electrodeposition cell was constructed of glass rather than polyethylene) at an applied potential of 100 volts and of 200 volts. At either voltage, there was rapid current cut-off during the coating process. The freshly deposited, adherent films were smooth and uniform in thickness. The deposited film remained adherent during the water-rinse step of the process. All of the films were dried and weighed. The coated panels were baked at 175° C. for 20 minutes to destroy residual cationic groups in the deposited film. When the baked films were soaked in water at ambient conditions for 24 hours, the films appeared unaffected, i.e., there was no evidence of solvation, blushing or loose film. The coating weights of two panels coated at an applied potential of 100 volts were 204 milligrams and 186 milligrams whereas for two panels coated at an applied potential of 200 volts the coating weights were 151 milligrams and 171 milligrams, respectively.

What is claimed is:

1. A method for applying an adherent, hydrophobic, smooth, uniform coating to an object having an electroconductive surface comprising:
   (1) immersing the object in a coating bath comprising an aqueous dispersion of cationactive particles of water-insoluble, essentially electrically non-conductive, organic, film-forming polymer wherein the cationactivity is provided at least predominantly by reducible nitrogen-containing cations having polarographic half-wave reduction potentials at 25° C. more positive than −1.8 volts measured at a dropping mercury electrode referred to a saturated calomel electrode; the quantity of said reducible nitrogen-containing cations being from about 0.02 milliequivalent to about 0.6 milliequivalent per gram of polymer; said aqueous dispersion having a pH from about 2 to about 12 and having a conductivity of from about 300 micromhos to about 3,500 micromhos per centimeter as measured at 25° C. and 10 percent solids; and wherein any cations of water-soluble salts having electrode potentials more negative than −2.40 volts referred to a standard hydrogen electrode are limited to concentrations from 0 to less than 0.002 normal;
   (2) passing an electric current through said bath sufficient to effect deposition of a coating of said polymer on the object by providing a difference of electrical potential of from about 100 volts to about 5,000 volts between the object and an electrode that is
      (a) spaced apart from said object;
      (b) in electrical contact with said bath; and
      (c) electrically positive in relation to said object; said coating which is deposited continuing to be adherent in the presence of water after the difference of electrical potential is discontinued; with the proviso that when the potential is applied for short, intermittent times, the potential is from about 200 volts to about 5,000 volts.

2. The method of claim 1 in which the electrical current is direct current.

3. The method of claim 2 in which the reducible nitrogen-containing cation is provided by a surfactant.

4. The method of claim 2 in which the nitrogen-containing cation predominantly is present as a substituent on the polymer.

5. The method of claim 2 in which the aqueous dispersion has a solids content of from about 2 percent to about 15 percent by weight.

6. The method of claim 2 in which the dispersion is maintained at a pH of from greater than 6 to about 10.

7. The process of claim 6 which has the step of increasing the conductivity by adding a supporting electrolyte while maintaining the pH substantially constant.

8. The method of claim 6 in which the pH is from about 7 to about 10.

9. The method of claim 2 in which the potential is applied continuously at from about 125 volts to about 350 volts.

10. The method of claim 2 in which the potential is applied for short, intermittent times at from about 200 volts to about 800 volts.

11. The method of claim 2 in which the conductivity of the aqueous dispersion is from about 600 micromhos to about 1,800 micromhos per centimeter as measured at 25° C. and 10 percent solids.

12. The method of claim 2 in which a supporting electrolyte is added to increase the conductivity of the aqueous dispersion.

13. The method of claim 12 in which the supporting electrolyte is diammonium hydrogen phosphate.

14. The method of claim 1 which has the additional step of heating the deposited coating to destroy at least most of the cationic groups remaining after deposition.

15. A method for coating an electrically conductive surface with a water-insoluble, adherent, essentially electrically non-conductive, organic, film-forming polymer comprising providing an aqueous dispersion of the polymer as cation-active particles wherein the cation-activity is provided at least predominantly by a reducible nitrogen-containing cation, the quantity of said reducible nitrogen-containing cations being from about 0.02 milliequivalent to about 0.6 milliequivalent per gram of polymer; said dispersion having a pH from about 2 to about 12 and having a conductivity of from about 300 micromhos to about 3,500 micromhos per centimeter as measured at 25° C. and 10 percent solids and wherein any cations of water-soluble salts having electrode potentials more negative than $-2.40$ volts referred to a standard hydrogen electrode are limited to concentrations from 0 to less than 0.002 normal, using the dispersion as a bath in an electrophoretic cell comprising an anode and a cathode wherein at least a part of the surface of said cathode comprises the surface to be coated, connecting said anode and said cathode to a source of electromotive potential of from about 100 volts to about 5,000 volts, applying said potential across said anode and said cathode to pass an electric current through the dispersion and thereby to electrodeposit said polymer in the form of a smooth, uniform, adherent coating on at least a part of said cathode surface; said reducible nitrogen-containing cation having a polarographic half-wave reduction potential at 25° C. more positive than $-1.8$ volts measured at a dropping mercury electrode referred to a saturated calomel electrode and being quaternized pyridinium, quinolinium, isoquinolinium, phthalazinium, benzimidazolium, benzothiazolium, benzotriazolium ions or activated acyclic quaternized nitrogen ions; with the proviso that when the potential is applied for short, intermittent times, the potential is from 200 volts to about 5,000 volts.

* * * * *

UNITED STATES PATENT AND TRADEMARK OFFICE
CERTIFICATE OF CORRECTION

PATENT NO. : 4,225,407
DATED : September 30, 1980
INVENTOR(S) : Earl H. Wagener; Ritchie A. Wessling; Dale S. Gibbs It is certified that error appears in the above-identified patent and that said Letters Patent are hereby corrected as shown below:

Column 12, Table II, under column entitled "Efficiency Mg/Coul.", Example H, delete "5.8(c)" and insert --6.8(c)--.

Column 14, line 25, delete "unde" and insert --under--.

Column 14, line 41, delete "acylate" and insert --acrylate--.

Column 14, line 44, delete "pyridinum" and insert --pyridinium--.

Column 16, line 26, second heading, delete "mq." and insert --mg.--.

Column 17, line 11, delete "brush-" and insert --blush- --.

Column 18, line 28, delete "milligrams" and insert --milligrams--.

Signed and Sealed this

Third Day of March 1981

[SEAL]

Attest:

RENE D. TEGTMEYER

Attesting Officer    Acting Commissioner of Patents and Trademarks